United States Patent [19]

Kaihara

[11] Patent Number: 4,762,389

[45] Date of Patent: Aug. 9, 1988

[54] OPTICAL FIBER CONNECTOR

[75] Inventor: Shigeru Kaihara, Tokyo, Japan

[73] Assignee: NEC Corporation, Tokyo, Japan

[21] Appl. No.: 716,064

[22] Filed: Mar. 26, 1985

[30] Foreign Application Priority Data

Mar. 30, 1984 [JP] Japan .................. 59-62427
Mar. 30, 1984 [JP] Japan .................. 59-63956

[51] Int. Cl.$^4$ ............................................. G02B 6/38
[52] U.S. Cl. .................. 350/96.21; 350/96.20
[58] Field of Search ............... 350/96.20, 96.21, 96.22

[56] References Cited

U.S. PATENT DOCUMENTS

| | | | |
|---|---|---|---|
| 4,240,695 | 12/1980 | Evans | 350/96.21 |
| 4,268,115 | 5/1981 | Slemon et al. | 350/96.21 |
| 4,418,983 | 12/1983 | Bowen et al. | 350/96.21 |
| 4,435,036 | 3/1984 | Sasakawa | 350/96.20 |
| 4,477,146 | 10/1984 | Bowen et al. | 350/96.21 |
| 4,539,476 | 9/1985 | Donuma et al. | 350/96.20 |
| 4,684,210 | 8/1987 | Matsunaga et al. | 350/96.20 |

Primary Examiner—William L. Sikes
Assistant Examiner—Brian M. Healy
Attorney, Agent, or Firm—Sughrue, Mion, Zinn, Macpeak & Seas

[57] ABSTRACT

An optical fiber connector for connecting an optical fiber plug with an adapter wherein said plug has one or more ferrules for receiving one or more optical fibers each ferrule having an associated spring disposed coaxial with an outer periphery therewith, and a slip-out prevention member fixed to each ferrule to retain the spring in position. A first housing member receives said one or more ferrules, spring members and slip-out prevention members. A second housing accommodates the first housing and is slidably disposable therewith. The plug engages an adapter and is secured thereto by sliding the second housing member relative to the first housing member.

7 Claims, 7 Drawing Sheets

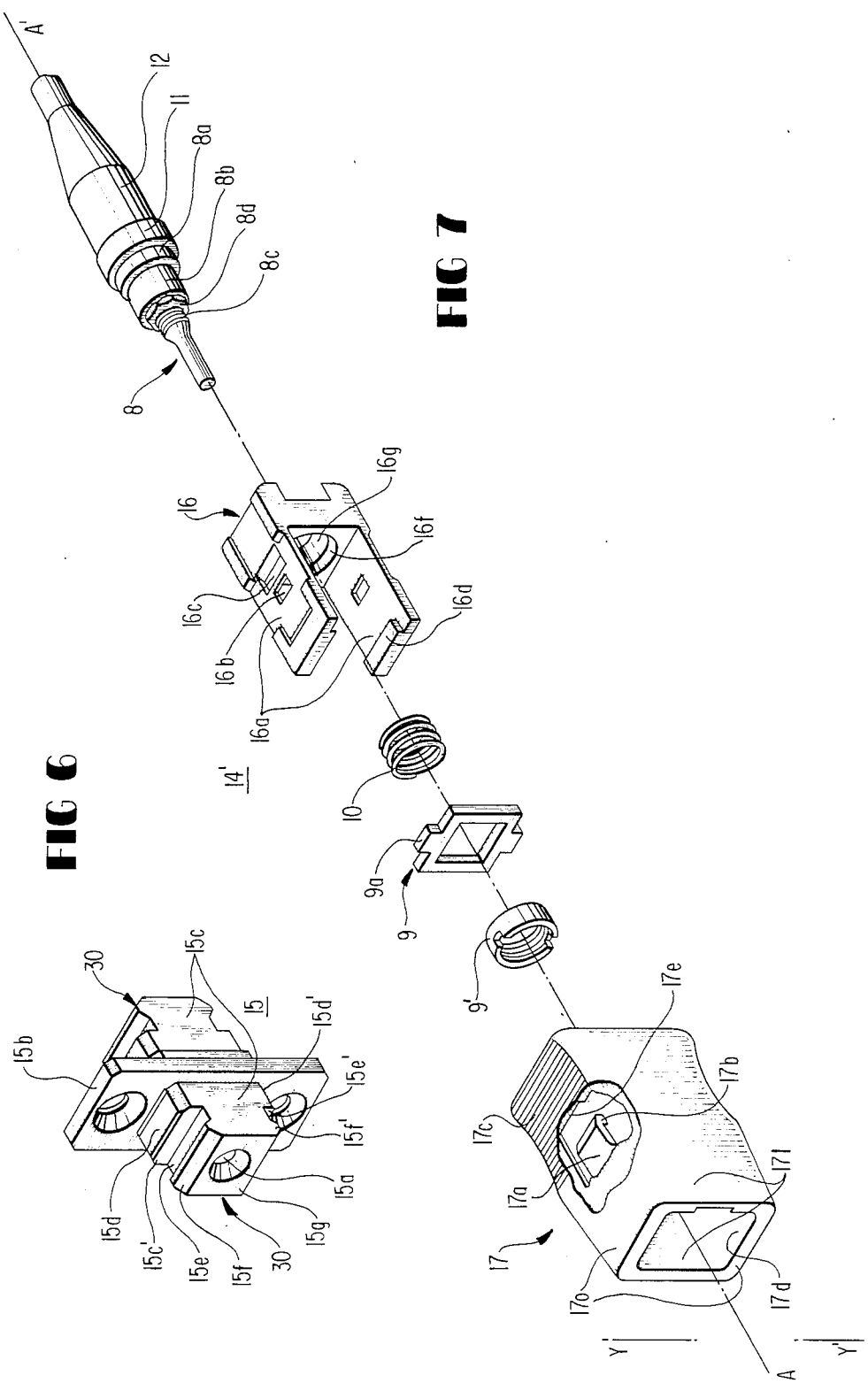

OPTICAL FIBER CONNECTOR

BACKGROUND OF THE INVENTION

The present invention relates to an optical fiber connector for optical communications applications and, more particularly, to a non-rotation type optical fiber connector which allows easy coupling and uncoupling manipulations and provides a secure connection.

Connection between a pair of optical fibers and/or between an optical fiber and an optical component, such as a light emitting, or light receiving element has been implemented by various kinds of optical fiber connectors. One type of such connectors comprises a pair of plugs which are each fixed to an end of an optical fiber, and an adaptor through which the opposite optical fibers are interconnected with the optical axes of the plugs aligned. For the connection of an optical fiber with a light emitting or light receiving element, the plugs are inserted into a receptacle in which the light emitting or light receiving element is built. In this kind of optical fiber connector, the primary requisite is that the plugs must be detachably coupled with the adaptor or with the receptacle.

The connectors heretofore proposed may generally be classified into three typical types, i.e., a threaded connection type, a bayonet connection (BNC) type, and a non-rotation connection type. Among them, although the non-rotation type is inferior to the threaded type concerning the secureness of coupling, it has been extensively used as simple connector coupling means partly because it allows the plugs and the adaptor or the receptacle to be coupled by easy manipulation.

Referring to FIGS. 1 and 2, side elevation of a prior art optical fiber connector of the non-rotation type is shown. In FIG. 1, a plug and an adaptor of the connector are shown in an uncoupled position and, in FIG. 2, in a coupled position.

An adaptor 1 has a generally rectangular end portion (unnumbered) which is provided with recesses or grooves 5 and a projection 3 emerging from the recesses 5. The projection 3 has tapered portions 3a and 3b at opposite ends thereof. A plug 2 includes a ferrule 8 fixed to an end of an optical fiber cord 13 and securely accommodating therein an optical fiber which extends through the cord 13, and a housing 6 in which the ferrule 8 is disposed. A pair of elastic arms 6a extend from the housing 6 toward the tip of the ferrule 8 in parallel to the center axis of the ferrule 8 and each is provided with a pawl 4 at its free end. The pawls 4 are each provided with tapered portions 4a and 4b which will make contact with and mate with the tapered portions 3a and 3b of the adaptor projection 3 when the plug 2 is coupled with the adaptor 1.

When the ferrule 8 is inserted into the adaptor 1, the tapered portions 4a of the pawls 4 abut against the respective tapered portions 3a of the adaptor projection 3. As the ferrule 8 is thrusted deeper into the adaptor 1, the elastic arms 6a of the plug 6 are urged away from each other until they reach the recesses 5 of the adaptor 1. Then, the arms 6a spring back toward each other so that the pawls 4 mate with the respective recesses 5 as shown in FIG. 2, in which the tapered sections 3b and 4b are engaged with each other.

To uncouple the connector, the plug 2 is pulled away from the adaptor 1. This urges the elastic arms 6a away from each other with the tapered portions 4b sliding on the associated tapered portions 3b, until the plug 2 becomes clear of the adaptor 1.

Due to the above construction, when forces act on the plug 2 and the adaptor 1 in opposite directions, they are apt to spread the elastic arms 6a of the housing 6 away from each other causing the plug 2 to easily and unwantedly slip off the adaptor 1. This drawback may be coped with by, for example, thickening the elastic arms 6a to prevent them from easily moving away from each other, or increasing the mating depth of the pawls 4 with the recesses 5, or omitting all the tapered portions 4a and 4b of the pawls 4 and those 3a and 3b of the adaptor projection 3. All such schemes, however, would make manipulations for coupling and uncoupling the adaptor 1 and plug 2 troublesome.

It will be seen from the above that the prior art non-rotation type connector cannot readily attain a sufficiently great coupling force while facilitating easy coupling and uncoupling operations, that is, one of the two requisites can be satisfied only at the sacrifice of the other. Especially, where an optical fiber has a small diameter core or provided with a cable sheath whose resistance to bending is substantial, it is hard to accomplish reliable coupling by means of the prior art connector of the type concerned.

SUMMARY OF THE INVENTION

It is therefore an object of the present invention to provide an optical fiber connector which achieves not only a secure connection between the plugs and the adaptor in an operative position but also easy coupling and uncoupling by manipulations.

In accordance with the present invention, an optical fiber connector for connecting an optical fiber plug and an adaptor for receiving the optical fiber plug comprises a ferrule for fixing an optical fiber on a center axis thereof, a spring member positioned coaxially with the ferrule and along an outer periphery of the ferrule, a slipout-preventing member fixed to the ferrule for preventing the spring member from slipping out, a first housing for accommodating the ferrule, the spring member and the slipout-preventing member, and a second housing for accommodating the first housing, the adaptor including a block which is provided with a bore, side surfaces extending along a center axis of the bore, and recesses formed in a part of each of the side surfaces.

The first housing is provided with a pair of extensions extending toward a tip of the ferrule along a side periphery of the ferrule, and a pawl protruding from a tip of each of the extensions toward the center axis of the ferrule to mate with a part of an outer periphery of the adaptor. The second housing is provided with a bore for accommodating the first housing and slidable for a predetermined amount of distance in a direction parallel to the center axis of the ferrule in contact with an outer periphery of the first housing. The plug and the adaptor are connected by mating the recesses of the block of the adaptor with the respective pawls of the first housing while inserting the tip of the ferrule into the cylindrical bore of the adaptor and, then, sliding the second housing to a position where the second housing covers the extensions of the first housing.

With the above construction, the optical fiber connector of the present invention sets up a secure connection between the plug and the adaptor and, at the same time, allows remarkably easy manipulations for coupling and uncoupling the adaptor.

BRIEF DESCRIPTION OF THE DRAWINGS

FIG. 6 is a perspective view of an adaptor according to a second embodiment of the present invention as well as to the first embodiment;

FIG. 7 is an exploded perspective view of a plug according to the second embodiment;

DESCRIPTION OF THE PREFERRED EMBODIMENTS

Preferred embodiments of the present invention will hereinafter be described with reference to the accompanying drawings.

Figure 1:
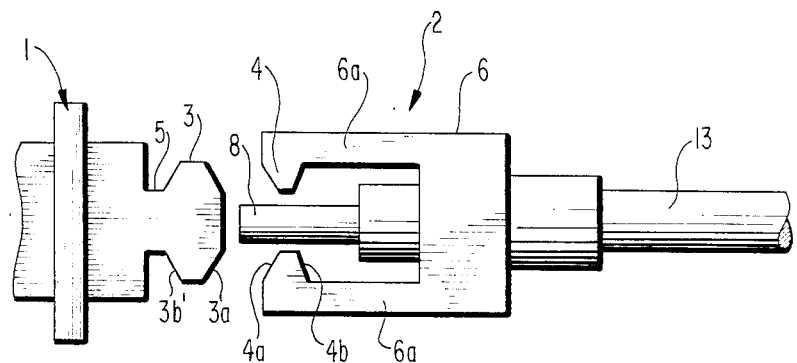
FIGS. 1 and 2 are side elevations showing a prior art non-rotation type optical fiber connector in a position before coupling and after coupling, respectively.
Figure 2:
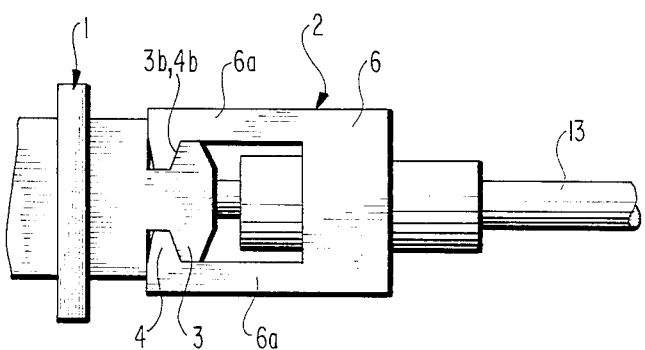
Figure 3:
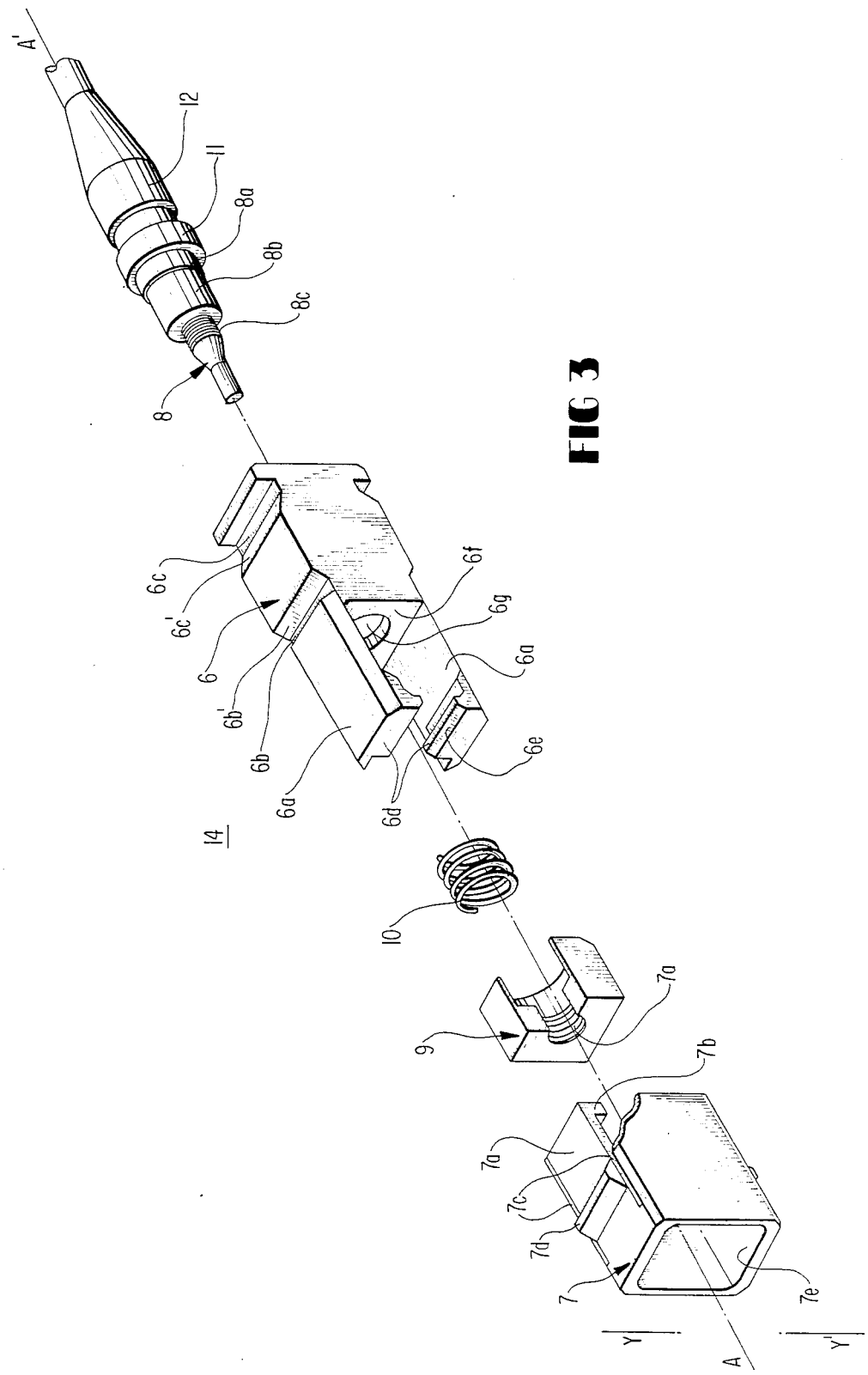
FIG. 3 is an exploded perspective view of a plug according to a first embodiment of the present invention.

Referring to FIG. 3, a plug applicable to a first embodiment of the present invention is shown in an exploded view. The plug, generally 14, comprises a first housing 6, a spring 10, a spring retainer 9, and a second housing 7 which are arranged in this order along the center axis A-A' of a cylindrical ferrule 8. An axis labelled Y-Y' intersects the axis A-A' perpendicular thereto.

Figure 4:
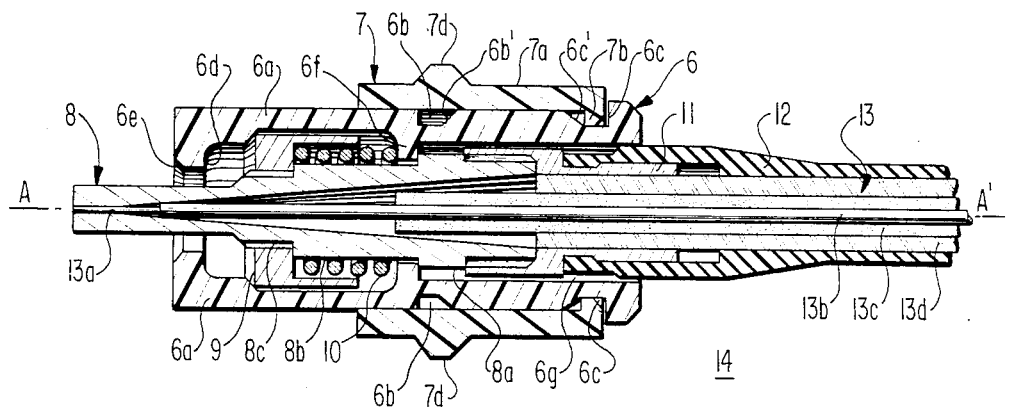
FIG. 4 is a longitudinal section taken along a plane which contains axes A-A' and Y-Y' of FIG. 3 showing the plug in an assembled condition.

The plug 14 assembled along the axes A-A' is shown in FIG. 4 in a longitudinal section taken along a plane which contains the axis Y-Y'. In FIG. 4, a fiber optic cable 13 is made up of a jacket 13b covering an optical fiber 13a, a tension member 13c surrounding the jacket 13b, and a sheath 13d. In the drawing, the optical fiber 13a and the jacket 13b are each shown in a side elevation. A cylindrical metallic sleeve 11 is coupled over the outer periphery of the tip portion of the sheath 13d and fixed thereto by adhesive. Disposed around the metallic sleeve 11 and fiber optic cable 13 is a rubber tube 12 in order to absorb tensions acting on the cable 13. The sleeve 11 is designed to have a larger inside diameter in its tip portion than in its portion which is adhered to the fiber optic cable 13. The inner wall of the larger diameter portion of the sleeve 11 is threaded to engage a threaded rear end portion of the ferrule 8. The ferrule 8 accommodates therein the tension member 13c, jacket 13b and optical fiber 13a of the fiber optic cable 13 and connected integrally thereto by adhesive or resin. The optical fiber 13a is fixed in place on the center axis A-A' of the ferrule 8.

The ferrule 8 includes a first cylindrical portion 8a extending toward the tip of the ferrule 8 from the threaded rear end portion which engages the sleeve 11 as earlier mentioned, a second cylindrical portion 8b smaller in diameter than the first cylindrical portion 8a, and a threaded portion 8c. The ferrule 8 is inserted into the first housing 6 such that the first cylindrical portion 8a is positioned in a cylindrical bore 6g of the housing 6. The bore 6g is provided with a shoulder 6f which abuts against the front end of the first cylindrical portion 8a of the ferrule 8, thereby restricting the rearward movement of the housing 6. Disposed around the second cylindrical portion 8b of the ferrule 8 is the spring 10 and around the threaded portion 8c, the spring retainer 9. The spring retainer 9 is screwed onto the threaded portion 8c. The spring 10 is seated on the spring retainer 9 at one end and on the shoulder 6f of the housing 6 at the other end.

The first housing 6 of the plug 14 is provided with a pair of flat extensions 6a each being parallel to the axis A-A'. Pawls 6d extend toward the axis A-A' of the ferrule 8, i.e., toward each other, from the tips of the respective extensions 6a. Each pawl 6d is formed with a tapered portion 6e at its end. The housing 6 is also provided with recesses 6b in its outer periphery adjacent to the shoulder 6f and recesses 6c adjacent to its rear end. Each recess 6b is partly defined by a tapered portion 6b', and each recess 6c by a tapered portion 6c'.

The first housing 6 is received in a rectangular bore 7e formed through the second housing 7. Flat extensions 7a extend rearwardly from the second housing 7 along the axis A-A' and each is provided by forming two slits 7c through the housing 7. The extensions 7a have individual pawls 7b at their free ends. In this construction, while the housing 7 is manipulated to slide on the housing 6 along the axis A-A', the pawls 7b will mate with either one of the recesses 6b and the recesses 6c of the housing 6. In this instance, the sliding movement of the housing 7 will be facilitated by the tapered portions 6b' or 6c' of the recesses 6b or 6c as well as by knobs 7d which are provided on the outer periphery of the housing 7.

Sequential steps for assembling the plug 14 described above will be discussed with reference to FIG. 3. The spring 10 and the spring retainer 9 are placed between the two flat extensions 6a of the first housing 6 and, then, the housing 6 is inserted into the second housing 7. Next, the ferrule 8 to which the fiber optic cable 13 has been fixed is inserted into the first housing 6 from behind, whereafter the subassembly of the spring retainer 9, spring 10, and first and second housings 6 and 7 is rotated about the ferrule 8. This sets up engagement of the threaded portion 8c of the ferrule 8 and the threaded bore 9a of the spring retainer 9, thereby completing the plug assembly.

Referring to FIG. 6, there is shown an adaptor 15 to which the plug 14 is to be coupled. As shown, the adaptor 15 comprises a flange 15b and a pair of hollow blocks 30 which are mounted on opposite sides of the flange 15b. Each of the hollow blocks 30 is formed with a cylindrical bore 15a and mounted on the flange 15b with the center axes of the bore 15a aligned with that of the other block 30. Each block 30 includes a pair of parallel side surfaces 15c and 15c' and another pair of parallel side surfaces 15d and 15d'. A section perpendicular to the center axis of the block is substantially rectangular. The end face 15g of the block 30 is parallel to the general plane of the flange 15b. The side surfaces 15d and 15d' respectively are provided with recesses 15e and 15e' which extend parallel to the end face 15g, while terminating respectively at tapered projections 15f and 15f'. The projections 15f and 15f' each have a height which is lower than their associated side surface 15d or 15d'.

Figure 5:
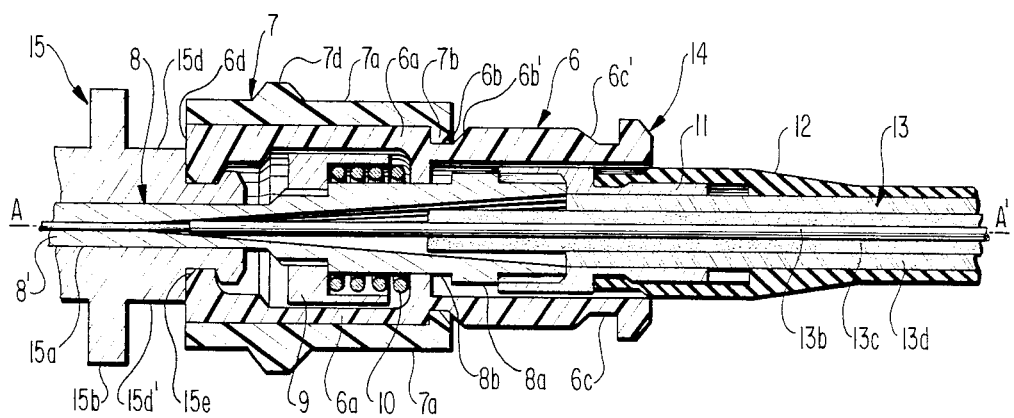
FIG. 5 is a section of the first embodiment of the present invention.

Referring to FIG. 5, the plug 14 is shown in a position coupled with the adaptor 15 and abutted against the tip of a ferrule 8' of the opposite plug. To couple the plug 14 with the adaptor 15, as shown in FIG. 4, the second housing 7 is moved to the rear portion of the first housing 6. Then, the ferrule 8 is inserted into the bore 15a of the adaptor 15. The plug 14 is fusted until the pawls 6d of the first housing 6 mate respectively with the recesses 15e and 15e' of the adjacent hollow block 30 of the adaptor 15. Finally, the second housing 7 is moved toward the tip of the ferrule 8 to bring its pawls 7b into engagement with the recesses 6b. As a result, as shown in FIG. 5, the extensions 6a of the first housing 6 are entirely nested in the second housing 7, while the ferrule 8 is urged by the spring toward the tip via the spring retainer 9 so as to abut against the opposite ferrule 8'.

As understood from FIG. 5, once the plug 14 is coupled with the adaptor 15, the second housing 7 prevents the extensions 6a of the first housing 6 from opening or spreading away from each other. Hence, the plug 14 will not slip off the adaptor 15 unless the second housing 7 is manipulated. This insures a secure connection between the plug 14 and the adaptor 15.

As discussed above, the embodiment described above makes coupling manipulations of and uncoupling an optical fiber connector remarkably easy and, in addition, sets up connection which is secure enough to eliminate separation of the plug from the adaptor as the result of vibrations, impacts, etc.

Referring to FIG. 7, a plug 14' according to a second embodiment of the present invention is shown in an exploded view. The plug 14' comprises a first housing 16, a spring 10, a square metallic stop 9 having a pair of lugs 9a at two facing sides thereof, a ring-like nut 9', and a second housing 17, which are arranged in this order along the center axis A-A' of a cylindrical ferrule 8. An axis labelled Y-Y' is perpendicular to the axis A-A'.

Figure 8:
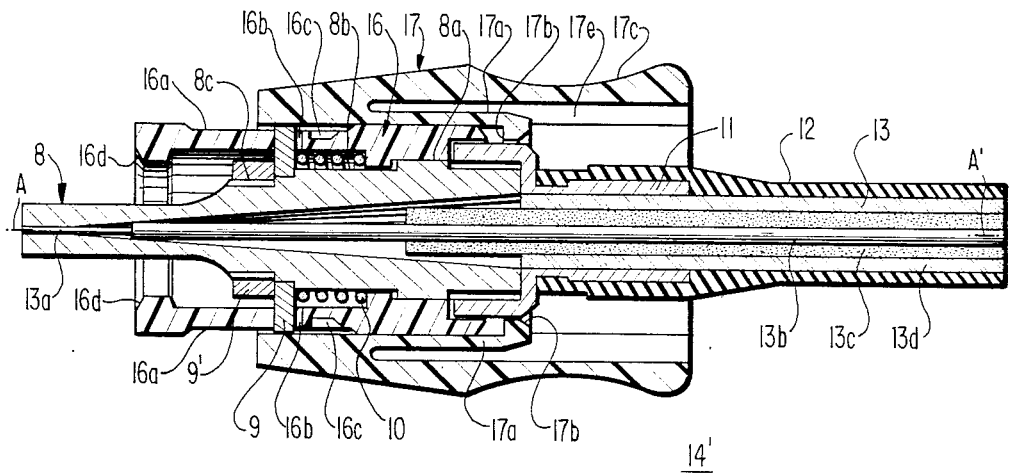
FIG. 8 is a longitudinal section taken along a plane which contains axes A-A' and Y-Y' of FIG. 4 showing the plug in an assembled condition.

The plug 14' is shown in FIG. 8 in a longitudinal section taken along a plane which contains the axes A-A' and Y-Y'. A fiber optic cord 13 is provided integrally with the ferrule 8. The ferrule 8 of FIGS. 7 and 8 differs from that of FIGS. 3 and 4 in that it includes a generally octagonal stop seat 8d adjacent to the threaded portion thereof. The stop seat 8d is adapted to receive the stop 9 as will be described.

The ferrule 8 is accommodated in the first housing 16 with the spring 10 interposed therebetween. The spring 10 is retained by the nut 9' with the stop 9 intermediate thereto stop 9. The nut 9' is fixed to the threaded portion 8c of the ferrule 8.

The first housing 16 is provided in its rear part with a cylindrical bore 16g for accommodating a first cylindrical portion 8a of the ferrule 8 and a shoulder 16f contiguous with the bore 16g. The shoulder 16f is adapted to abut against the front end of the first cylindrical portion 8a to restrict the rearward movement of the housing 16. A pair of flat extensions 16a extend parallel to the axis A-A' from a position of the housing 16 where the shoulder 16f is located toward the tip of the ferrule 8. The extensions 16a are each provided with a pawl 16d at its free end which extends toward the axis A-A' and a rectangular opening 16b at its center. The lugs 9a of the stop 9 are received in the openings 16b of the respective extensions 16a. The width of the openings 16b in a direction parallel to the axis A-A' of the ferrule 8 is designed greater than the thickness of the stop 9 so that the first housing 16 may be movable relative to the ferrule 8 to some extent even after the ferrule 8 has been secured in the first housing 16. Recesses 16c are formed in the respective extensions 16a at the rear of the openings 16b.

The first housing 16 now carrying the ferrule 8 is put in the second housing 17, which is made of plastic. The housing 17 comprises four walls 170 and 171 which cooperate to define a bore 17d having a rectangular cross-section. Each of the upper and lower walls 170 is partly configured in a double-wall structure, that is, it partly bifurcates into an inner wall 17a and an outer wall 17c which extend axially at a distance from each other. The outer wall 17c includes a bent portion which is knurled in a direction perpendicular to the axis A-A'. The inner wall 17a is free at opposite sides thereof and provided with a pawl 17b at its tip which protrudes toward the axis A-A'. When the second housing 17 is moved along the axis A-A', the pawls 17b will be brought into locking engagement with the respective recesses 16c.

Figure 9:
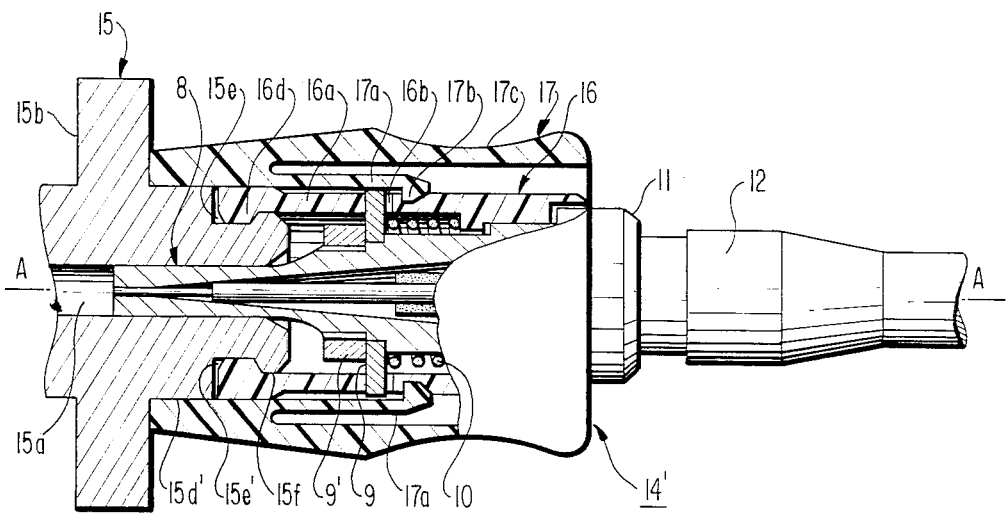
FIG. 9 is a section of the second embodiment of the present invention.

Referring to FIG. 9, the plug 14' described above with reference to FIGS. 7 and 8 is shown in a side elevation and in a position coupled with the adaptor 15 shown in FIG. 6.

In FIG. 9, the ferrule 8 is inserted into the bore 15a of the adaptor 15, while the pawls 16d at the tip of the extensions 16a of the first housing 16 are engaged in the respective recesses 15e and 15e'. The second housing 17 is moved forwardly until its right and left walls 171 make contact with the respective side surfaces 15c, 15c' of the hollow block 30 and the upper and lower walls 170 with the other respective side surfaces 15d and the respective extensions 16a of the first housing 16. The pawls 17b of the inner walls 17a of the second housing 17 are received in the respective recesses 16c of the housing 16. The front end of the housing 17 remains abutted against the flange 15b of the adaptor 15.

To connect the plug 14' to the adaptor 15, the first housing 17 is shifted rearwardly to expose the extensions 16a of the housing 16 to the outside, as shown in FIG. 8. Then, the plug 14' is inserted into the adaptor 15 until the pawls 16d of the extensions 16a mate with the respective recesses 15e and 15'e. Finally, the second housing 17 is moved toward the adaptor 15 with the result that the extensions 16a are individually pressed inwardly by the housing 17 and the pawls 17b of the inner walls 17a of the housing 17 are received in the respective recesses 16c of the housing 16. In this condition, the housing 17 is prevented from being displaced by vibrations of impacts and, thereby causing the plug to disconnect from the adaptor.

In accordance with the second embodiment shown and described, the walls 17a each having the pawl 17b for fixing the second housing 17 to the first housing 16 are located inside the housing 17 so that, while the housing 17 is slide on the outer periphery of the housing 16 toward the tip of the plug held by hand. The pressure applied to the housing 17 toward the axis A-A' is hardly imparted to the inner walls 17a or the pawls 17b. This allows the housing 17 to smoothly slide and, thereby, enhance efficient manipulation to establish the connection. In addition, since the housing 17 is mated with the adaptor 15 at the front end, the housing 17 will not move even if an external force is applied to the plug in any direction. Therefore, the force acting on the ferrule 18 due to bending as earlier mentioned is almost zero so that the ferrule 18 will not easily be damaged.

Figure 10:
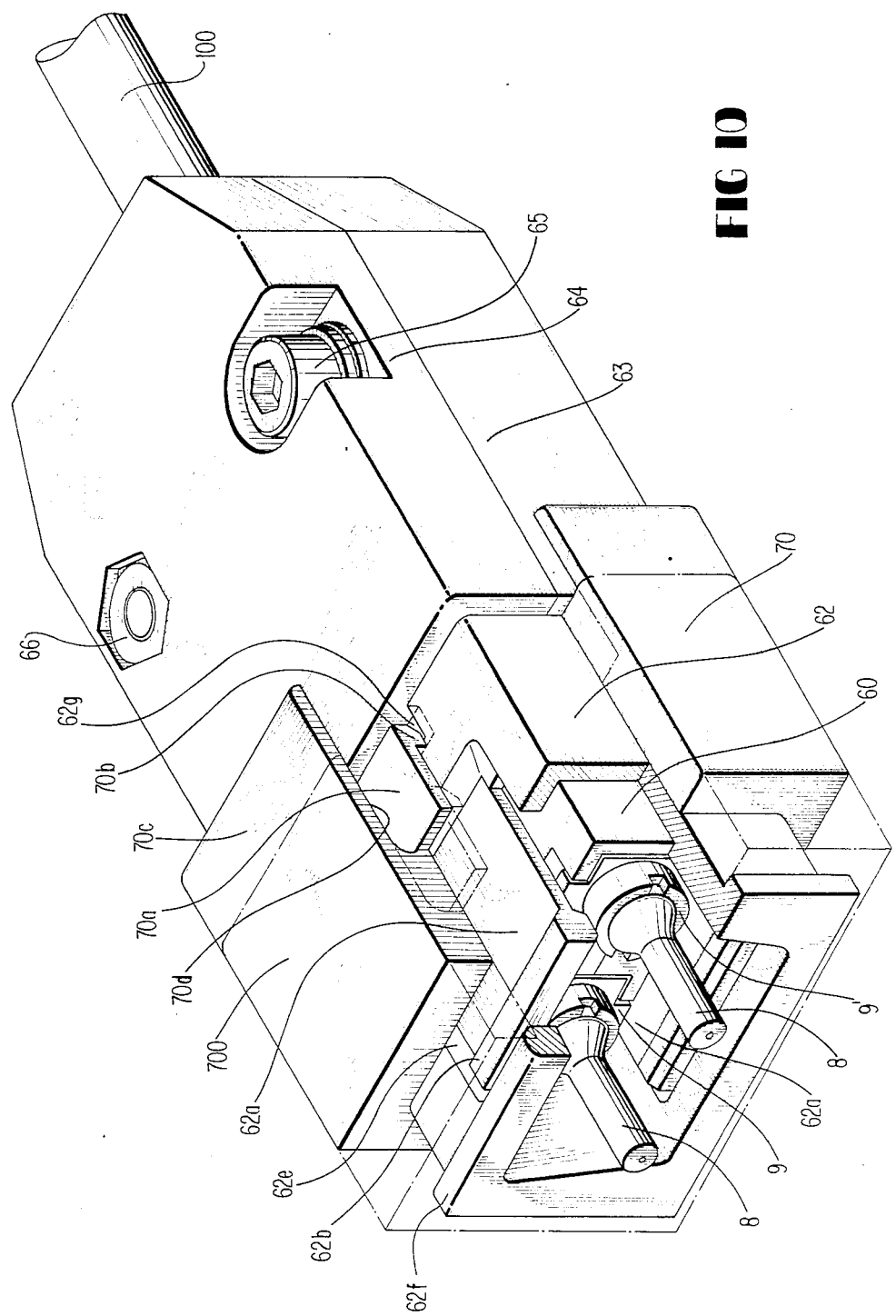
FIG. 10 is a partly taken away perspective view of a plug according to a third embodiment of the present invention.

Referring to FIG. 10, a two-pin type plug according to a third embodiment of the present invention is shown in a partly broken away, sectional perspective view. The plug is shown in a perspective view in FIG. 11 with a second housing 10 removed for clarity.

Figure 11:
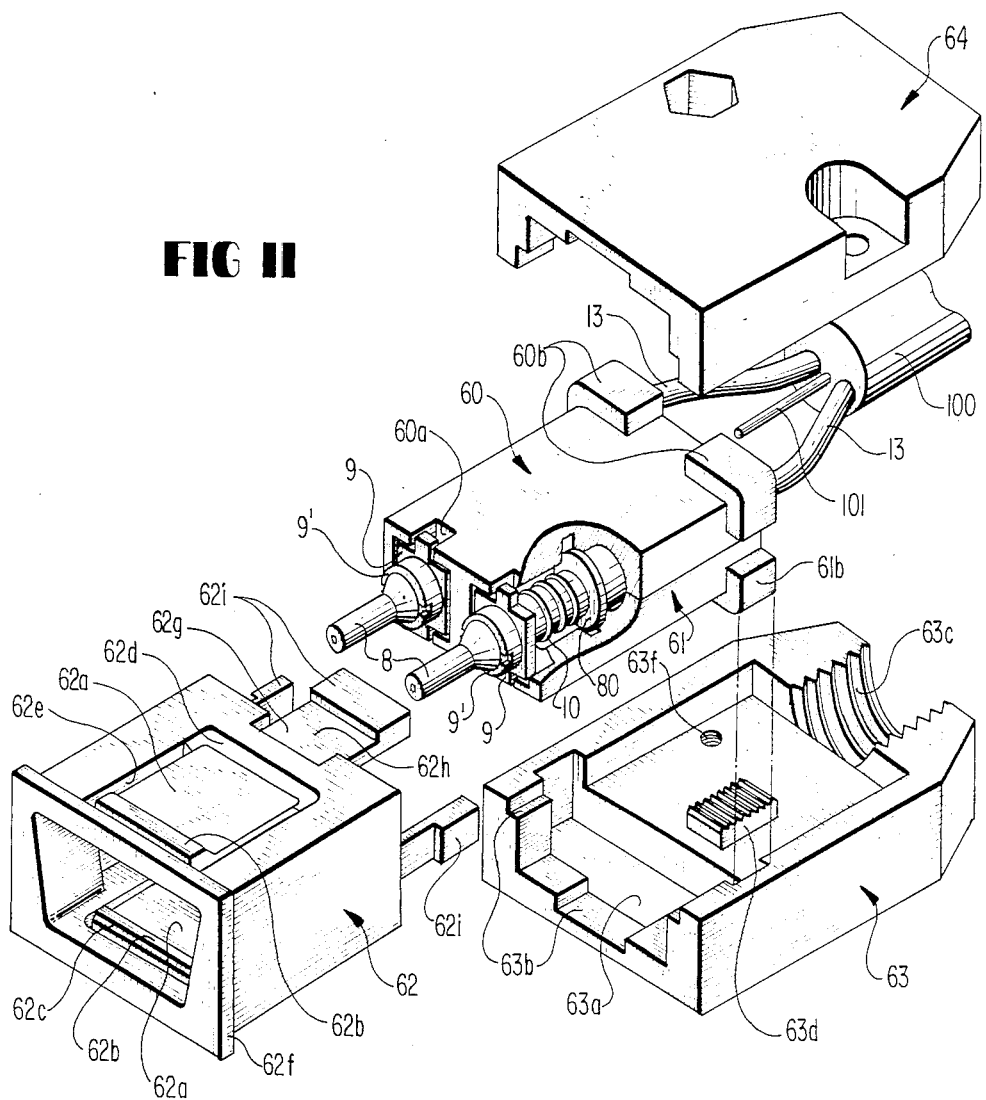
FIG. 11 is an exploded perspective view of the plug of FIG. 10 with a second housing removed.

In FIG. 11, two optic fiber cables 13 and a tension-resisting member 101 extend from one end of a duplex cable 100. Each fiber optic cable 13 is identical in construction with the fiber optic cable 13 shown in FIG. 8. Two ferrules 8 are shown each fixing an optical fiber extending through the fiber optic cable 13 on its center axis. A nut 9' and a spring retainer 9 are fixed in place on the outer periphery of each ferrule 8 as has been the case with the construction of FIG. 8, while a spring 10 and a ring 80 are coupled over the ferrule 8 but not fixed thereto.

The ferrules 8 are received in a pair of cooperative plug holders 60 and 61 from opposite sides. The plug holders 60 and 61 fix the ring 80 associated with each ferrule 8 and receive the spring retainer 9 in their aligned notches 60a. The notches 60a are dimensioned sufficiently large in the axial direction so that pressing the tip of the ferrule 8 will allow the ferrule 8 to move rearward along the axis thereof overcoming the force of the spring 10. Pawls 60b and 61b are provided on the rear side surfaces of the plug holders 60 and 61.

The plug holders 60 and 61 accommodating the ferrules 8 therein are in turn accommodated in a housing 62. Four projections 62h extend rearwardly from the four walls of the housing 62 and each is provided with an outwardly protruding pawl 62i at its tip. When the plug holders 60 and 61 are inserted into the housing 62, the pawls 62i will each be positioned between the adjacent pawls 60b and 61b of the plug holders 60 and 61 and, thereby, provide a flat surface in cooperation therewith.

The plug holders 60 and 61, housing 62 accommodating the plug holders 60 and 61 therein, and duplex cable 100 are fixed together by second holders 63 and 64. The holders 63 and 64 are identical in construction and, therefore, only the holder 63 will be described by way of example. As shown, the holder 63 includes a recess 63a for receiving the pawls 60b and 61b of the plug holder 61 and the pawls 62i of the housing 62, recesses 63b for receiving those portions of the projections 62h other than the tips, a cable holding section 63c for holding the cable 100, and a lug 63d for restraining the tension-resisting member 101 of the cable 100. The other holder 64 is engaged with the holder 63 from above to fix the various members mentioned above in place. Screws 65 (in FIG. 10) are each passed through a hole 63f, while a nut 66 is driven over each screw 65 to thereby fasten the holders 63 and 64 to each other.

Characteristic features of the third embodiment reside in the configurations of the housing 62 and a housing 70 which is used in the manner shown in FIG. 10.

Figure 12:
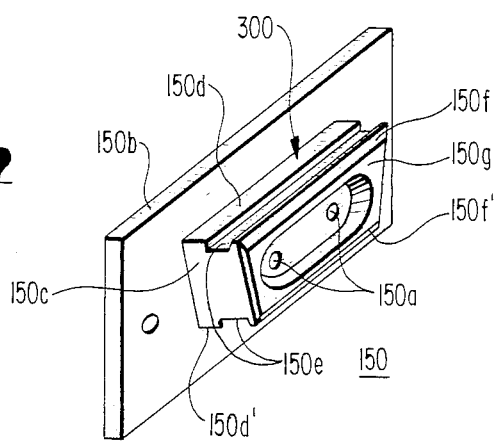
FIG. 12 is a perspective view of an adaptor according to the third embodiment.

The housing 62 is coupled with an adaptor 150 shown in FIG. 12. The upper and lower walls of the housing 62 are each provided with a flat projection 62a extending forwardly in a direction parallel to the axis of the ferrule 8, and a opening 62e. The projection 62a is formed with a tapered portion 62d at its base end and terminates at a pawl 62b at its free end, the pawl 62b protruding in both directions, i.e., toward and away from the axis A–A' of the ferrule 8. Provided on the inner sides of the pawls 62b are tapered portions 62c adapted to facilitate coupling of the housing 62 with the adaptor 150. The front end of the housing 62 is provided with a flange 62f, while a rear end portion of the same is formed with notches 62g. The notches 62g will not be concealed by the holder 63 or 64 when the housing 62 is fixed in place by the holders 63 and 64.

As shown in FIG. 10, the housing 62 is accommodated in the second housing 70. The inner surfaces of the second housing 70 make contact with the outer surfaces of the housing 62. Upper and lower walls 700 of the second housing 70 are each bifurcated by a slot 70d away from the ferrule tips to provide an outer wall 70c and an inner wall 70a lying one above the other. Each inner wall 70a is free at opposite sides thereof and formed with a pawl 70b at the tip which extends toward the ferrule axis.

As shown in FIG. 10, the pawl 70b is engated in the notch 62g on the outer periphery of the housing 62 to fix the second housing 70 in place. As the second housing 70 is caused to slide forwardly, the front end of the housing 70 abuts against the flange 62f and the pawl 70b against the tapered portion at the base of the extension 62a, whereby the housing 70 is securely retained.

In FIG. 12, the adaptor 150 with which the housing 62 will be coupled, includes a flange 150b and a pair of hollow blocks 300 provided on opposite sides of the flange 150b. Each hollow block 300 has side surfaces 150d and 150d' which are parallel to each other and side surfaces 150c and 150c' which are not parallel to each other. Thus, the hollow block 300 has a substantially trapezoidal section when taken in a direction perpendicular to the axis of the block 300. The end 150g of the block 300 extends parallel to the general plane of the flange 150b. Recesses 150e respectively are formed in the side surfaces 150d and 150d' in parallel to the end 150g. The four side surfaces 150c, 150c', 150d and 150d' are provided with tapered protuberances 150f and 150f' at their free ends. The height of the protuberances 150f and 150f' from the recesses 150e, 150e' is smaller than that of the side surfaces 150d and 150d'.

To couple the plug shown in FIG. 10 to the adaptor 150, the ferrules 8 are thrusted each into a bore 150a of the adaptor 150 and, then, the flange 62f at the end of the housing 62 is brought into abutting engagement with the flange 150b of the adaptor 150. This causes the pawls 62b of the housing 62 to be retained by the respective recesses 150e of the adaptor 150. This is followed by sliding the second housing 70 toward the tip of the ferrule 8 until it abuts against the flange 62f. In this position, the pawls 62b are retained between the second housing 70 and the recesses 150e of the adaptor 150 so that, even if the plug and adaptor are pulled away from each other, the pawls 62b will not slip out of the recesses 150e. Such allows the plug and the adaptor to couple very securely with each other.

What is claimed is:
1. An optical fiber connector comprising:
an optical fiber plug, said plug including:
a ferrule for fixing an optical fiber on a center axis thereof said ferrule having a terminal tip;
a spring member positioned coaxially with said ferrule and along an outer periphery of the ferrule;
a slipout-preventing member fixed to the ferrule for preventing said spring member from slipping out;
a first housing for accommodating the ferrule, the spring member and the slipout-preventing member, said first housing being provided with a pair of parallel extensions, each extending toward said terminal tip of the ferrule along an opposite side periphery of the ferrule, and a pawl protruding from a tip of each of said extensions toward the center axis of the ferrule; and a second housing for accommodating said first housing and slidable a predetermined amount in a direction parallel to the center axis of the ferrule in contact with an outer periphery of said first housing, said second housing being so configured that said pair of parallel extensions snugly fit into said second housing and are prevented from expanding from each other at a position where said second housing is moved forward along said pair of parallel extensions;

an adapter for receiving said optical fiber plug, said adapter including:

a block provided with a cylindrical bore for receiving the ferrule, said block having a pair of parallel outer side surfaces which are disposed symmetrically about a center axis of said bore, and a recess provided in a part of each of said side surfaces;

the plug and the adapter being connected by mating the recesses of said block of the adapter with the respective pawls of the first housing while inserting the tip of the ferrule into the cylindrical bore of the adapter and, then, sliding the second housing to said position.

2. An optical fiber connector as claimed in claim 1, wherein the second housing is provided with extensions on outer surfaces thereof which make contact with the first housing, said extensions extending parallel to the center axis of the ferrule and each being provided with a pawl which protrudes toward the center axis of the ferrule to engage with a part of the outer surface of the first housing.

3. An optical fiber connector as claimed in claim 1, wherein walls of the second housing which make contact with the first housing are each partly separated by slits to provide a double-wall structure made up of an outer wall and an inner wall, said inner wall extending along the center axis of the ferrule to engage with the outer surface of the first housing.

4. An optical fiber connector comprising:

an optical fiber plug, said optical fiber plug including;

one or more ferrules each fixing an optical fiber on a center axis thereof;

spring means associated with each said ferrule and being positioned coaxially with and at an outer periphery of its respective ferrule;

a slip-out prevention member associated with each said spring means and being fixed to its respective ferrule for retaining each said spring means in a predetermined relationship with its respective ferrule;

a first housing for accommodating said one or more ferrules, said spring means, and said slip-out prevention members wherein said housing includes plural engagement means; and a second housing accommodating said first housing therein and being slidable with respect to said first housing in a direction parallel to said center axis said second housing being so configured that said plural engagement means snugly fit into said second housing and are prevented from expanding from each other at said second position when said second housing is moved forward along said plural engagement means between a first position and a second position;

an adapter for receiving said optical fiber plug, said adapter including:

a block provided with a number of bore holes equal in number to the number of ferrules in said plug, each said bore hole associated with and receiving one said ferrule, and a means for receiving said engagement means;

wherein the plug and adapter are operative to be connected such that each of said one or more ferrules is inserted in its associated respective bore hole and said second housing is operative to be slidably moved relative to said first housing and said adapter, when connected, such that said plural engagement means are secured by the receiving means when said second housing is in said second position.

5. The optical fiber connector as claimed in claim 4 further comprising: a plug holder for securing said one or more ferrules in a predetermined relationship and said first housing comprises an upper half and a lower half which are joined to surround said plug holder.

6. The optical fiber connector as claimed in claim 4 wherein said first housing is provided with a pair of extensions with a pawl protruding from a tip of each of said extensions and said means for receiving constitutes a pair of recesses for receiving said pawls.

7. The optical connector claimed in claim 4 wherein said slip-out prevention member comprises a retainer having an aperture to allow an end of said ferrule to pass therethrough and, a nut wherein said nut is threadably secured to said end of said ferrule causing said retainer to bear against said spring means.

* * * * *